Figures 1, 2, 3:
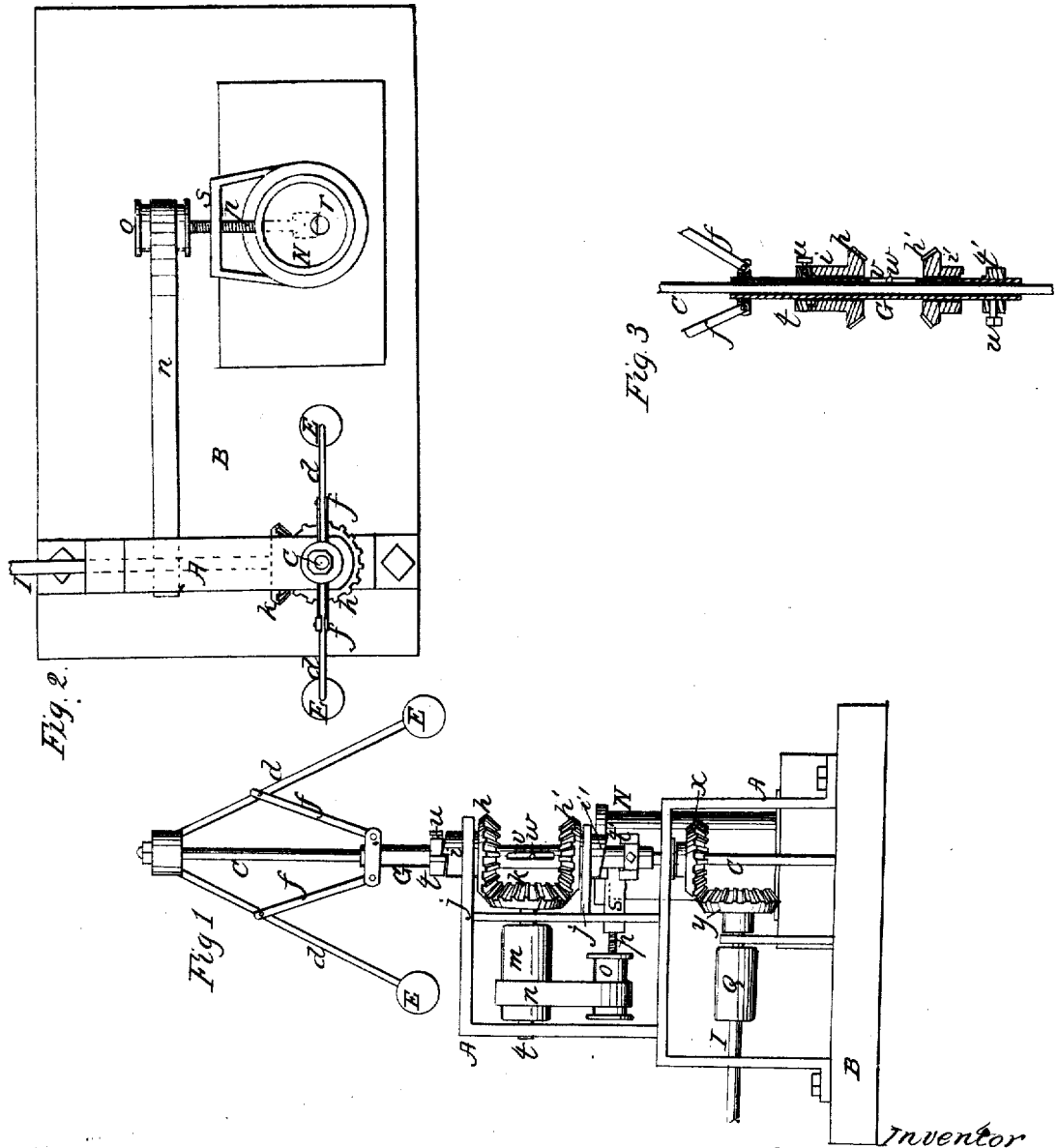

E. C. Edmonds,
Governor.

Nº 58,996.

Patented Oct. 23, 1866.

Witnesses:
Jay Hyatt
A. E. Allen

Inventor
E. C. Edmonds
by J. Fraser & Co., Atty.

UNITED STATES PATENT OFFICE.

E. C. EDMONDS, OF BUFFALO, NEW YORK.

IMPROVEMENT IN STEAM-ENGINE GOVERNORS.

Specification forming part of Letters Patent No. 58,996, dated October 23, 1866.

*To all whom it may concern:*

Be it known that I, E. C. EDMONDS, of the city of Buffalo, in the county of Erie and State of New York, have invented a certain new and useful Improvement in the Mode of Operating Steam-Valves; and I do hereby declare that the following is a full and exact description thereof, reference being had to the accompanying drawings, in which—

Figure 1 is a view in elevation of my improvement. Fig. 2 is a plan of the same. Fig. 3 is a longitudinal section of the sliding shaft and appurtenances detached.

Like letters designate corresponding parts in all the figures.

My invention consists in the combination of parts hereinafter specifically claimed, by which the throttle-valve of a steam-pipe is operated, so as not only to regulate the supply of steam to correspond with the resistance to be overcome, but also to adjust the size of the valve-port to the amount of pressure within the boiler. This is accomplished by connecting the arms of the ordinary centrifugal balls with the upper end of a slip shaft or sleeve, to which it is secured, so as to adjust thereon two clutches of any ordinary construction, that alternately engage with the hubs of two bevel-pinions loosely mounted on said sliding shaft and within suitable bearings, which bevel-pinions are in gear with a third bevel-pinion between them, on the horizontal shaft of which is a pulley, connecting by a band with a similar one on a screw-shaft that operates the valve, to open or close the port, according as the upper or lower clutch is engaged.

In the drawings, A A represent the frame, of any suitable construction, secured to the base of floor B, by which the parts are supported. C is a vertical main shaft, rotating in suitable bearings in the frame A, to the upper end of which, in any proper manner, are jointed the divergent arms d d of the centrifugal balls E E. f f are two links or bars, jointed to the arms d d at a suitable position, which connect with and are jointed to the upper end of a sliding shaft or sleeve, G, on the main shaft C. h h are two bevel-pinions, with hubs i i', loosely mounted on shaft G and within suitable journals in the horizontal portions j j of the frame, which gear with a similar pinion, k, on a horizontal shaft, l. m is a pulley on the latter shaft, connecting by band n with a similar pulley, o, mounted on a screw-shaft, p, that operates the valve r, Fig. 2, to which it is secured in any desired manner. This screw p may be supported by traversing through a frame, s, secured to the steam pipe or cylinder N, as shown in the drawings, or in any other suitable way. The clutches t t' may be of any desired and suitable construction, so as to engage with the hubs i and i', and be capable of adjustment on the shaft G by means of set-screws u u, or equivalent, for a purpose hereinafter to be explained. There is a longitudinal slot, v, in the shaft G, with a pin, w, projecting from the main spindle C in the same, for the purpose of allowing the shaft or sleeve G to freely slide up and down shaft C, and to relieve the arms d and f of the strain which would otherwise come upon them in imparting motion to the sliding shaft.

Connection and motion are had with the working parts of the engine by means of a pinion, x, on the lower portion of shaft C gearing with a pinion, y, on a horizontal shaft, I, which is provided with pulley Q, that connects by a band with said parts; or any other suitable mechanism for the purpose may be employed.

My improvement operates in the following manner: Motion being communicated to the governor by the gearing x y, the arms E begin to diverge and raise the sleeve G by sliding it upon the main one C and within the hubs i i'. After the engine has attained the required maximum velocity, the lower clutch, t', (which should be adjusted by set-screw u so as to be immediately below the hub i' at this position of the sliding shaft,) will engage with said hub, which, through the medium of the pinions h' and k, pulleys m and o, and belt n, screws in the spindle p, to which the valve r is attached, gradually closing the port and partially shutting off the steam till the motion of the engine is retarded, causing the balls to collapse, and, by depressing the shaft G, disengage the clutch t'. Should the resistance to be overcome increase or other cause continue to retard the velocity, the upper clutch, t, (which is adjusted to allow a greater or less range of motion, as desired,) will, on its reaching the minimum point, engage with the hub i of the upper pinion, as shown in Fig. 1, which, being also geared with $k$, causes it to revolve in a direction opposite to that which it did when the clutch $t'$ was engaged, as above described, which unscrews $p$ and opens the valve till the greater supply of steam again causes the acceleration of speed, whereby the clutch is uncoupled and the valve left stationary.

One of the chief advantages of my improvement is the intermittent action of the mechanism in operating the valve, which is effected by the use of the adjustable clutches on the slip-shaft.

In the various methods usually employed in operating the throttle-valve, the action of the valve is continued with every change in the position of the balls, whether diverging or collapsing. For instance, when there is an increase in the resistance required to be overcome or a reduction of the pressure of steam within the boiler, or when both occur at the same time, the velocity of the machinery is retarded to a degree proportionate to the amount of such increased resistance or diminution of pressure before the valve can be opened far enough to admit sufficient steam to stop this retardation. Now, according to the ordinary methods, as soon as the motion begins to accelerate, the valve likewise begins to close, which prevents the machinery attaining its former speed, especially if there is much increase of resistance, and still more so when there is a considerable diminution of pressure in the boiler, as is the case toward the close of the day's work, when, in order to utilize the steam on hand, some other means have to be made use of to operate the valve.

By the use of my improvement the decrease in the motion of the machinery from the above causes is only temporary; for after the valve, under such circumstances, has once become sufficiently opened to cause an acceleration of the velocity, the valve-operating mechanism uncouples by the disengagement of the clutch $t$, and thus leaves the valve open, while the motion continues to increase until it reaches the maximum velocity, which may be greater or less as the lower clutch, $t'$, is adjusted higher or lower on the slip-shaft, as the mean range of motion is fixed by adjusting these clutches farther apart or nearer together. In like manner, with the common devices, when there is an increased pressure or a decrease in the resistance the reverse takes place; for as soon as the accelerated speed begins to slacken from the partial closing of the valve, then this retardation begins immediately to open the valve again, thereby preventing the proper reduction of the speed so long as either of the said causes continue to operate. With my device the acceleration is only temporary; for when the reduction of the speed begins, from the closing of the valve, the latter remains at rest, instead of opening, until the minimum of motion and required limit is reached, which is regulated by the adjustment of the upper clutch, $t$.

Thus, not only is a more uniform velocity of the machinery attained by the use of my improvement, which for many purposes is of the greatest importance, but the machine can be run at a low pressure of steam without the inconvenience usually attending the same, and thereby utilizing a considerable amount of steam that would otherwise be wasted.

The use of the screw-shaft for opening or closing the valve enables the latter to be moved gradually and uniformly, and a very slight change in its position effected, which cannot be attained by the ordinary methods.

The adjustability of the clutches enables the engine to be adapted to overcome a greater resistance, or to operate with a less pressure of steam, with a diminution in the speed, by so arranging them on the slip-shaft that any specified velocity will cause a greater opening of the valve. It also renders the machine capable of being adjusted to run at any specified higher or lower velocity, which is frequently of much importance where various kinds of work are required to be performed by the same machine.

What I claim as my invention, and desire to secure by Letters Patent, is—

1. The combination of the adjustable clutches $t\ t'$ with the slip-shaft $G$, loose pinions $h\ h'$, bevel-wheel $k$, and spindle $C$, for producing an intermittent motion to the valve-operating mechanism, substantially in the manner set forth.

2. In combination with the above, the screw-valve shaft $p$, pulley $o$, band $n$, and pulley $m$, for operating the valve $r$, arranged and operating substantially in the manner specified.

E. C. EDMONDS.

Witnesses:
JAY HYATT,
JAMES C. BROWN.